United States Patent [19]

Yamakawa et al.

[11] Patent Number: 4,764,490

[45] Date of Patent: Aug. 16, 1988

[54] PROCESS FOR PREPARATION OF SINTERED SILICON NITRIDE

[75] Inventors: Akira Yamakawa; Masaya Miyake; Takao Nishioka, all of Hyogo, Japan

[73] Assignee: Sumitomo Electric Industries, Ltd., Osaka, Japan

[21] Appl. No.: 849,330

[22] Filed: Apr. 8, 1986

[30] Foreign Application Priority Data

Apr. 8, 1985 [JP] Japan .................................. 60-73898

[51] Int. Cl.$^4$ ............................................ C04B 35/58
[52] U.S. Cl. ........................................ 501/97; 501/98
[58] Field of Search ................................... 501/97, 98

[56] References Cited

U.S. PATENT DOCUMENTS 3,409,417 11/1968 Yates .................................... 264/332
4,234,343 11/1980 Anderson ............................. 501/98

FOREIGN PATENT DOCUMENTS 59-190270 10/1984 Japan .................................... 501/97
59-190274 10/1984 Japan .................................... 501/97
60-235768 11/1985 Japan .................................... 501/97

Primary Examiner—Steven Capella
Attorney, Agent, or Firm—Jones, Tullar & Cooper

[57] ABSTRACT

Disclosed is a process for preparation of a sintered silicon nitride. The process comprises the steps of:
 mixing a powder of silicon nitride with a powder of a sintering agent;
 compacting the obtained mixture; and
 sintering the compacted mixture in a non-oxidizing atmosphere.

The feature of the process is that the powder of the sintering agent includes a powder mixture of oxide and/or hydroxide of at least two kinds of metals which has been prepared by co-precipitation.

Due to the use of the co-precipitated powder as the sintering agent, it is possible to obtain a sintered silicon nitride having an excellent strength and uniformity in quality. The obtained sintered silicon nitride is preferably used as an engineering ceramic.

39 Claims, No Drawings

PROCESS FOR PREPARATION OF SINTERED SILICON NITRIDE

FIELD OF THE INVENTION

The present invention relates to a process for the preparation of sintered silicon nitride. More particularly, the present invention relates to a process for preparing a sintered silicon nitride having improved strength and uniformity in quality.

BACKGROUND OF THE INVENTION

The sintered silicon nitride has hithereto attracted attention in industrial circles as one of the new engineering ceramics for use as a high temperature structural member. Silicon nitride is, however, a compound in which the atoms tend to be bonded together by covalent bonding, and thus it is difficult to sinter as it is. For this reason, compounds of low melting point are generally added to silicon nitride to improve its sintering property.

In most of the prior art processes, sintering agents of oxides have been used such as the oxides of aluminum (Al), magnesium (Mg), yttrium (Y), rare earth elements of lanthanide series such as lanthanum (La) and cerium (Ce), beryllium (Be) and ziroconium (Zr). Further, nitrides and oxinitrides of the above elements have also been used as a sintering agent.

With an ordinary process for the preparation of sintered silicon nitride, however, each compound of the sintering agent is separately added to and mixed with the powder of silicon nitride. It is also known to use as a sintering agent the powder which is abraded from the ball mill.

Even if the mixing of the sintering agent with the powder of silicon nitride is conducted for a long time, however, a uniform mixing or dispersion of the sintering agent cannot be attained by means of anyone of the prior art methods described above, so that a defect would be formed in the resulting product and the scattering results observed with respect to the mechanical properties thereof.

Particularly, it is often necessary to use more than two kinds of sintering agents in order to enhance the sintering property. Accordingly, it becomes all the more difficult to attain a uniform dispersion of the sintering agents in the powder of silicon nitride.

SUMMARY OF THE INVENTION

It is an object of the present invention to overcome the problems of the prior art described above and to provide a process for the preparation of a sintered silicon nitride which possesses high uniformity in quality and can be put into practical use as an engineering ceramic.

It is a further object of the present invention to provide a process for the preparation of a sintered silicon nitride, by means of which a uniform dispersion of the sintering agents can be attained so that a sintered silicon nitride can be prepared having a high uniformity in strength and quality.

It is a still further object of the present invention to provide a process for preparing a sintered silicon nitride presenting at the same time high strength, high abrasive resistance and a high uniformity in quality.

According to the present invention, there is provided a process for preparing a sintered silicon nitride comprising the steps of:
mixing a powder of silicon nitride with a powder of sintering agent;
compacting the obtained mixture; and
sintering the compacted mixture in a non-oxidizing atmosphere;
the process being characterized in that the powder of sintering agent includes a powder mixture of oxide and/or hydroxide of at least two kinds of metals which has been prepared by co-precipitation.

The co-precipitated powder preferably includes oxide and/or hydroxide of metals such as Mg, Al, Si, Sc, Y, lanthanide, Ti, Zr and Hf.

According to a preferred embodiment of the present invention, the sintering agent is mixed in an amount of 1.0 to 50 wt% calculated in terms of the oxide contained therein on the basis of the total weight of the resulting sintered silicon nitride.

According to a preferred embodiment of the present invention, the co-precipitated powder includes $ZrO_2$ and oxide of at least one element selected from the group consisting of Y and lanthanide. The content of $ZrO_2$ is preferably 1 to 25 vol% on the basis of the total volume of the sintered silicon nitride and the content of the oxide of Y or lanthanide is 0.5 to 10 wt% calculated in terms of the amount of the element on the basis of the total weight of the sintered silicon nitride.

According to a further preferred embodiment of the present invention, $ZrO_2$ is a cubic crystal which has been stabilized with CaO, MgO or $Y_2O_3$.

According to a still further preferred embodiment of the present invention, hydroxides of Zr and Y are co-precipitated and the co-precipitate is then burned to provide a powder of cubic $ZrO_2$ stabilized with $Y_2O_3$, which is preferably usable as a sintering agent.

It is further preferable to add 1 to 15 wt% of at least one element selected from the group consisting of the elements of IVa (except Zr), Va and VIa groups of the Periodic Table. The element selected from IVa (except Zr), Va and VIa groups of the Periodic Table may be added to the mixture in the form of anyone of carbide, nitride, carbonitride, oxide and the mutual solid solution thereof or in the co-precipitated form with oxide or hydroxide of Zr and Y or lanthanide.

It is preferable that the mean particle size of the co-precipitated powder is smaller than 2 microns.

According to the present invention, there is provided a process for preparing a sintered silicon nitride comprising the steps of:
mixing a powder of silicon nitride with a powder of $ZrO_2$ and $Y_2O_3$ or oxide of lanthanide;
compacting the obtained mixture; and
sintering the compacted mixture in a non-oxidizing atmosphere;
the process being characterized in that the powder of $ZrO_2$ and $Y_2O_3$ or oxide of lanthanide has been prepared by co-precipitation.

There is also provided, according to the present invention, a process for preparing a sintered silicon nitride comprising the steps of:
preparing an aqueous solution containing water-soluble chloride, nitrate or organic salt of at least two metals;
adjusting the pH of the aqueous solution to thereby co-precipitate hydroxides of the metals therefrom;

burning the co-precipitated hydroxides to form oxides of said metals in the form of powder;

mixing a powder of silicon nitride with said burned metal oxide powder;

compacting the obtained mixture; and sintering the compacted mixture in a non-oxidizing atmosphere;

whereby provided a sintered silicon nitride having improved strength and uniformity in mechanical properties.

Other and further objects, features and advantages of the present invention will be more clearly understood from the following description.

DETAILED DESCRIPTION OF THE INVENTION

In view of attaining the above object of the present invention, experiments and researches on the mixing method of the sintering agents, and have been conducted found that the above objects are effectively attained by using a powder of sintering agents which has been obtained by co-precipitation.

That is, the main feature of the present invention resides in that the powder of sintering agent includes a powder mixture of oxides and/or hydroxides of at least two kinds of metals which has been prepared by co-precipitation.

The metal oxides and/or hydroxides usable as a main sintering agent in the process according to the present invention include, for example, oxides and/or hydroxides of Mg, Si, Sc, Y, lanthanide, Ti, Zr, Hf.

These metal oxides and/or hydroxides are prepared by co-precipitation. Such a co-precipitation of metal oxides and/or hydroxides comprises the steps of:

preparing an aqueous solution of soluble metal compounds such as metal chlorides, metal nitrates and organic metal salts for example metal acetate; and lowering the solubility of the metal compounds in the aqueous solution, for example by adjusting the pH of the solution, to thereby co-precipitate the ingredients.

The thus obtained precipitates are generally composed of a uniform mixture of metal hydroxides which can be converted to metal oxides by thermal decomposition. Further it is possible to obtain a co-precipitate containing oxides and/or hydroxides at any desired ratio.

The process according to the present invention is conducted by following the main three steps, that is, the formulating step, compacting step and sintering step.

In the formulating step, the powder of sintering agents obtained by co-precipitation is mixed in a predetermined amount with a powder of silicon nitride. In the compacting step, the obtained mixture of the sintering agents and silicon nitride is compacted into a piece having a predetermined shape and size by means of die forming, rubber-press forming, extrusion forming, projection forming or mold forming. The thus obtained compact is then sintered under a non-oxidizing atmosphere by, for example, the normal pressure sintering, hot-pressing or high temperature hydrostatic pressing (HIP).

The atmospheric gas under which the sintering is conducted includes $N_2$ and the rare gas such as Ar, among which $N_2$ is the most preferable because of economical reasons.

Now, the reasons for defining the conditions of the process according to the present invention will be explained.

Non-oxide ceramics such as silicon nitride are generally bonded by covalent bonding and thus the sintering property thereof is low. Due to the low sintering property, it is necessary to add several kinds of sintering agents to heighten the sintering property.

In such a case, it is very important to disperse the sintering agents uniformly in the powder of the silicon nitride. This unformity of dispersion has a great influence on the physical properties of the resulting sintered product. Thus, it is essential to obtain a uniform dispersion in order to provide a practically usable sintered silicon nitride.

We found that, when sintering agents are co-precipitated from a solution, a powder of the sintering agents uniformly mixed with and dispersed in each other can be obtained with a particle size smaller than 2 microns. Use of such uniformly mixed powders can improve remarkedly the strength and uniformity in physical properties of the resulting sintered product.

We consider that because the powder obtained by co-precipitation contains several kinds of metal elements uniformly dispersed therein, the resulting sintered product prepared therefrom maintains the aimed chemical composition at any site thereof.

If a plurality of sintering agents are added to the powder of silicon nitride in the usual manner, it is very difficult to obtain a uniform dispersion of these sintering agents in the silicon nitride powder and thus the liquid phase is not formed uniformly in the course of the sintering thereof, thereby causing microscopic defects resulting in scattering qualities of the sintered product. Such defects can be cured according to the present invention.

According to the present invention, the amount of the sintering agent is preferably from 1.0 to 50 wt% of the total amount of the sintered silicon nitride. With the sintering agent in an amount outside the above range, desirable physical properties cannot be obtained.

The effect of each sintering agent used according to the preferred embodiment of the present invention will be explained.

$ZrO_2$ tends to react with $Y_2O_3$ and/or the oxide of the rare earth elements of the lanthanide series to enhance the sintering property to thereby heighten the density of the sintered silicon nitride. Namely, $ZrO_2$ reacts with $Y_2O_3$ and/or the oxide of the rare earth element of the lanthanide series to form an amorphous material such as ZrYON in the grain boundary of the silicon nitride, which amorphous material strongly bonds the silicon nitride grains to thereby heighten the density of the sintered silicon nitride. Further $ZrO_2$ is partially precipitated in the grain boundary of silicon nitride to improve the fracture toughness of the sintered silicon nitride.

Carbides, nitrides, carbonitride or oxides of the elements of the IVa (except Zr), Va and VIa groups of the Periodic Table are effective for improving the sintering property and at the same time preventing abnormal grain growth of silicon nitride to thereby provide a sintered material composed of fine and uniform grain. In more detail, whithout the addition of these compounds, the sintering agents of $Y_2O_3$ and $ZrO_2$ tend to react with $SiO_2$ to form a liquid phase, in which silicon nitride is resolved in the course of the sintering. Thus the sintering proceeds while silicon nitride is recrystallized from the liquid phase, which is inevitably accompanied with the grain growth of silicon nitride. The compounds of the elements of the IVa (except Zr), Va and VIa groups of the Periodic Table tend, however, to be diffused in the liquid phase to suppress the grain growth of the precipitated silicon nitride.

Further these carbides, nitrides, carbonitrides and oxides of the element of IVa (except Zr), Va and VIa groups of the Periodic Table themselves present a high hardness and are stable at high temperatures, and therefore they are effective to provide a sintered product excellent in mechanical and thermal properties.

That is, silicon nitride has generaly a low hardness and a low abrasive resistance because Si has a high affinity with Fe and presents a low hardness. To the contrary, the carbides, nitrides, carbonitrides and oxides of the element of IVa (except Zr), Va and VIa groups of the Periodic Table have a low affinity with Fe and present a high hardness, so that they are effective for improving the abrasive resistance of the cutting tool made from the sintered silicon nitride. The addition of these carbides, nitrides, carbonitrides or oxides together with the co-precipitated powder of $Y_2O_3$ and $ZrO_2$ enables the attainment of a sintered material having a high hardness and therefore a high abrasive resistance which can not be attained only with the addition of $Y_2O_3$ and $ZrO_2$.

These elements of IVa (except Zr), Va and VIa groups of the Periodic Table may be contained in the sintered silicon nitride in any form of carbide, nitride, carbonitride, oxide, mutual solid solution and admixture thereof and the adding effect thereof is the same in any form. Oxides and/or hydroxides of these elements, however, are preferably added in the co-precipitated form with $ZrO_2$ and $Y_2O_3$. For this sake, an aqueous solution is prepared containing Zr, Y and an element of IVa (except Zr), Va and VIa groups of the Periodic Table, and then the co-precipitation may be conducted to obtain a co-precipitate of the hydroxides of the elements. The co-precipitate of the hydroxides may be further thermally decomposed into oxides.

If the resulting sintered product contains $ZrO_2$ in an amount lower than 1 vol%, the effect of the addition thereof is not significant. On the other hand, with $ZrO_2$ in an amount higher than 25 vol%, the content of silicon nitride in the resulting sintered silicon nitride becomes proportionally lesser so that the mechanical strength and the hardness of the resulting sintered silicon nitride are abruptly lowered and, as explained in detail hereinafter, the grain growth is observed with a result that the mechanical strength and the abrasive resistance are further lowered. Accordingly, the content of $ZrO_2$ should be in the range of 1 to 25 vol%.

The content of $Y_2O_3$ and the oxide of the rare earth elements of the lanthanide series are defined in terms of the weight percent of these elements contained in the resulting sintered silicon nitride. If the amount of these elements is lower than 0.5 wt%, the adding effect is not significant, while the addition of these elements in an amount higher than 10 wt% lowers the high temperature strength and makes the microscopic structure of the resulting silicon nitride coarser with a result that mechanical strength and abrasive resistance are lowered. Accordingly, Y or lanthanide should be added in an amount of 0.5 to 10 wt% in the form of an oxide or hydroxide.

The added amount of carbide, nitride carbonitride, oxide or mutual solid solution of the element of IVa (except Zr), Va and VIa groups of the Periodic Table is defined in terms of the amount of these elements on the basis of the total weight of the sintered material. If the content of these elements in the sintered material is lower than 1 wt%, a significant adding effect is not obtained. The addition of these elements of higher than 15 wt% adversely affects the sintering property. Accordingly, the content of the elements belonging to IVa (except Zr), Va and VIa groups of the Periodic Table should be in the range of 1 to 15 wt% of the sintered material.

According to an embodiment of the present invention, $ZrO_2$ is cubic crystal stabilized by CaO, MgO or $Y_2O_3$.

$ZrO_2$ has three kinds of polymorphes, that is, monoclinic $ZrO_2$(m-$ZrO_2$), tetragonal $ZrO_2$(t-$ZrO_2$) and cubic $ZrO_2$(c-$ZrO_2$). While m-$ZrO_2$ is stable up to about 1100° C., it transforms to t-$ZrO_2$ over 1100° C. and to c-$ZrO_2$ over 2370° C. These phase transformations occur in reverse direction by cooling. Among them, it should be noted that the phase transformation between m-$ZrO_2$ and t-$ZrO_2$ is accompanied with a change in volume as high as 4%.

According to an embodiment of the present invention, stabilized c-$ZrO_2$ is used as a sintering agent to prevent the phase transformation of $ZrO_2$ for improving heat resistance.

$ZrO_2$ can be stabilized, for example, by adding to $ZrO_2$ $Y_2O_3$ in an amount of about 11 mol% and heating the mixture to higher than 1200° C.

According to a preferred embodiment of the invention, hydroxides of yttrium and zirconium are co-precipitated and then heated to higher than 1200° C. to convert the hydroxides to oxides and stabilize $ZrO_2$ as c-$ZrO_2$.

According to the results of the experiments conducted by the inventors, the mechanical strength and the abrasive resistance of the sintered silicon nitride are affected by the grain size of the silicon nitride. With a larger grain size, the mechanical strength and the abrasive resistance are lowered. If the grain size is larger than 3 microns, the sintered material is degraded in these properties.

On the other hand, the sintering agent is easily made to have a mean particle size smaller than 2 microns by co-precipitation.

The mixture of silicon nitride and the sintering agent is compacted and sintered in a non-oxidizing atmosphere such as nitrogen under high or normal pressure.

The hot pressing may be preferably conducted under a pressure higher than 50 kg/cm$^2$ and at a temperature of 1600° to 1900° C., preferably of 1700° to 1800° C. to thereby obtain silicon nitride of β phase, because silicon nitride transforms to β phase at about 1700° C. The identification of the β phase of silicon nitride can be made by X-ray diffraction.

The pressure in the nitrogen atmosphere may be a minimum value as far as the decomposition of silicon nitride can be suppressed thereunder. For example, the nitrogen atmosphere may be maintained under 1 atm. at a sintering temperature of 1700° C., and 10 atm. at a sintering temperature of 1800° C.

Further, for degassing the green compact, it may be heated under vacuum up to a temperature at which silicon nitride is not decomposed.

The present invention will be explained in more detail by way of Examples which illustrates the present invention only for representing the effect of the present invention. Thus, the example should not be construed to restrict the scope of the invention.

EXAMPLE 1

Solutions of chlorides of Al and Y were mixed at a molecular rate of 1:1 and then ammonium was added to the resulting mixture to thereby co-precipitate aluminum hydroxide and yttrium hydroxide. The thus obtained co-precipitate was burned at 1000° C. in atmosphere to obtain a powder mixture of aluminum oxide and yttrium oxide.

The powder mixture was added in the amount shown in Table 1 to a powder of silicon nitride of α type having a particle size of 0.6 microns, and mixed and ground by a ball mill. The mixed and ground powder was compacted and the obtained compact was then sintered at 1750° C. for 2 hours under a nitrogen atmosphere of 4 bars, to thereby obtain specimen Nos. 1 to 6.

For comparison, powders of $Al_2O_3$ and $Y_2O_3$ were mixed with the same powder of silicon nitride by means of a ball mill so as to obtain a powder mixture having the same chemical composition as the corresponding one of specimen Nos. 1 to 6. The obtained powder mixture was sintered under the same condition as the above to thereby provide specimen Nos. 11 to 16.

Specimens were cut from each of the obtained sintered materials. For each specimen, the bending strength and Weibull modulus (for 20 specimens) were determined, of which the results are described in Table I.

TABLE I

| Specimen No. | Sintering agent (wt %) $Y_2O_3$ powder | $Al_2O_3$ powder | co-precipitated powder | Physical properties Relative density (%) | Bending strength (Kgf/mm$^2$) | Weibull Modulus |
|---|---|---|---|---|---|---|
| **1 | — | — | 0.73 | 90 | 55 | 25 |
| 2 | — | — | 1.45 | 99 | 85 | 22 |
| 3 | — | — | 7.25 | 99 | 110 | 20 |
| 4 | — | — | 29.0 | 99 | 100 | 25 |
| **5 | — | — | 58.0 | 95 | 50 | 18 |
| 6 | — | — | 48.0 | 98 | 75 | 20 |
| *11 | 0.5 | 0.23 | — | 85 | 30 | 15 |
| *12 | 1.0 | 0.45 | — | 90 | 50 | 10 |
| *13 | 5.0 | 2.25 | — | 95 | 65 | 8 |
| *14 | 20.0 | 9.0 | — | 95 | 60 | 10 |
| *15 | 40.0 | 18.0 | — | 90 | 55 | 8 |
| *16 | 33.0 | 15.0 | — | 92 | 55 | 9 |

*Specimen Nos. 11 to 16 indicate the comparison examples.
**Specimen Nos. 1 and 5 are control examples.

In the examples listed in Table I, specimen Nos. 11 to 16 correspond respectively to specimen Nos. 1 to 6 with respect to the content of the sintering agent. Specimen Nos. 1 and 5 are control examples because the content of the sintering agent falls outside the range according to a preferred embodiment of the present invention.

As readily understood from the results shown in Table I, when $Y_2O_3$ and $Al_2O_3$ were added at an equal molecular ratio and in a total amount ranging from 1.0 to 50 wt%, a remarkable improvement in physical properties can be attained. In more detail, specimen Nos. 2 to 4 and 6 present excellent physical properties such as relative density, bending strength and Weibull modulus, as compared with other specimens. Specimen Nos. 1 and 5 are degraded with respect to bending strength, because the content of the sintering agent is outside of the range according to the preferred embodiment of the invention.

Accordingly, it will be understood that use of the co-precipitated sintering agent is very effective for the improvement in mechanical properties.

EXAMPLE 2

By using a variety of co-precipitated powders shown in Table II, specimen Nos. 21 to 25 were produced under the same condition as Example 1. The mechanical properties of the obtained sintered products were determined and the results are shown also in Table II. For comparison, specimen Nos. 31 to 35 were also produced by using the same oxides in the same amount as the corresponding one of specimen Nos. 21 to 25, except that the oxides had not been subjected to co-precipitation. The mechanical properties of these specimens are also shown in Table II.

TABLE II

| Specimen No. | Sintering agent (wt %) | Physical properties Relative density (%) | Bending strength (Kgf/mm$^2$) | Weibull Modulus |
|---|---|---|---|---|
| 21 | 15 ($Al_2O_3$ + MgO) | 99 | 95 | 20 |
| 22 | 15 ($ZrO_2$ + MgO) | 99 | 90 | 22 |
| 23 | 15 ($La_2O_3$ + $Y_2O_3$) | 98 | 85 | 25 |
| 24 | 15 ($HfO_2$ + $Al_2O_3$) | 99 | 90 | 20 |
| 25 | 15 ($Y_2O_3$ + $ZrO_2$) | 97 | 80 | 30 |
| *31 | 10$Al_2O_3$ + 5MgO | 96 | 70 | 10 |
| *32 | 10$ZrO_2$ + 5MgO | 96 | 65 | 10 |
| *33 | 5$La_2O_3$ + 10$Y_2O_3$ | 92 | 50 | 8 |
| *34 | 10$HfO_2$ + 5$Al_2O_3$ | 96 | 60 | 12 |
| *35 | 10$Y_2O_3$ + 5$ZrO_2$ | 92 | 50 | 10 |

*Specimen Nos. 31 to 35 indicate the comparison examples.

As readily understood from Table II, use of co-precipitated and burned powder including $ZrO_2$, MgO, $La_2O_3$, $HfO_2$ is effective in improving the physical properties of the sintered product as $Al_2O_3$ and $Y_2O_3$ (Example 1).

Further, we produced sintered silicon nitride by using the co-precipitated powder of metal hydroxides without burning the same. We confirmed that a similar improvement in mechanical properties can be attained by using the as co-precipitated powder of hydroxides.

EXAMPLE 3

By using 7.25 wt% of co-precipitated powders each containing $Al_2O_3$ and $Y_2O_3$ in a molecular ratio as shown in Table III, the sintering was conducted under the same condition as Example 1, to thereby prepare specimen Nos. 41 to 44. The mechanical properties of each obtained sintered silicon nitride were determined, of which the results are also shown in Table III.

For comparison, sintering agents of oxides which had not been subjected to co-precipitation but had the same molecular ratio as the corresponding one of specimen Nos. 41 to 44 were used to sinter silicon nitride. The mechanical properties of the obtained specimen Nos. 51 to 54 are also shown in Table III.

EXAMPLE 5

By using powders as shown in Table V as the sintering agent, silicon nitride was sintered under the same condition as Example 4.

That is, in the examples according to the present invention, that is, specimen Nos. 84 to 86, powders which had been co-precipitated and burned were used. On the other hand, in the comparison examples, powders of metal oxides which had not been subjected to co-precipitation were used in the same amount and at the same molecular ratio as the corresponding one of specimen Nos. 84 to 86, to thereby obtain specimen Nos. 81 to 83.

The mechanical properties of the resulting sintered silicon nitride are shown also in Table V.

TABLE III

| Specimen No. | Sintering agent (wt %) | | | Physical properties | | |
|---|---|---|---|---|---|---|
| | $Al_2O_3$ (wt %) | $Y_2O_3$ (wt %) | co-precipitated powder Molecular ratio | Relative density (%) | Bending strength (Kgf/mm$^2$) | Weibull Modulus |
| 41 | — | — | $20Al_2O_3$-$80Y_2O_3$ | 98 | 100 | 20 |
| 42 | — | — | $40Al_2O_3$-$60Y_2O_3$ | 99 | 110 | 21 |
| 43 | — | — | $60Al_2O_3$-$40Y_2O_3$ | 99 | 120 | 25 |
| 44 | — | — | $80Al_2O_3$-$20Y_2O_3$ | 98 | 100 | 18 |
| *51 | 0.7 | 6.55 | — | 94 | 60 | 12 |
| *52 | 1.7 | 5.55 | — | 95 | 70 | 10 |
| *53 | 2.9 | 4.25 | — | 95 | 70 | 8 |
| *54 | 4.7 | 2.55 | — | 95 | 65 | 10 |

*Specimen Nos. 51 to 54 indicate the comparison examples.

As shown in Table III, use of co-precipitated powder containing $Al_2O_3$ and $Y_2O_3$ in a molecular ratio from 20:80 to 80:20 is very effective for improving mechanical properties of the resulting sintered silicon nitride.

EXAMPLE 4

Co-precipitated powders each including Zr and Y at a certain molecular ratio were burned in the atmosphere at a temperature ranging from 800° to 1000° C. to thereby provide a co-precipitated powder containing $ZrO_2$ and $Y_2O_3$ at a weight ratio of 1:2. Then, the obtained powder was mixed in an amount indicated in Table IV with silicon nitride powder and compacted. The compact was sintered at 1800° C. for 2 hours under a nitrogen atmosphere of 8.0 atms to obtain specimen Nos. 66 to 70.

For comparison, powders of $ZrO_2$ and $Y_2O_3$ were added to a silicon nitride powder respectively in the same amount as the corresponding one of specimen Nos. 66 to 70. The powder mixture was mixed and ground by a ball mill and then sintered under the same condition as the above to obtain specimen Nos. 61 to 65.

The mechanical properties of the sintered products are shown in Table IV.

TABLE V

| No. | Sintering agent (wt %) | Relative density (%) | Bending strength (Kgf/mm$^2$) | Weibull Modulus |
|---|---|---|---|---|
| *81 | $0.2La_2O_3 + 0.4ZrO_2$ | 85.0 | 45 | 10 |
| *82 | $5La_2O_3 + 10ZrO_2$ | 94.5 | 55 | 9 |
| *83 | $15La_2O_3 + 30ZrO_2$ | 95.0 | 60 | 11 |
| **84 | $0.6 (La_2O_3 + ZrO_2)$ | 90.0 | 75 | 22 |
| 85 | $15 (La_2O_3 + ZrO_2)$ | 98.5 | 95 | 23 |
| 86 | $45 (La_2O_3 + ZrO_2)$ | 98.5 | 95 | 25 |

*Specimen Nos. 81 to 83 indicate the comparison examples.
**Specimen No. 84 is control example.

The results shown in Table V reveal that use of $La_2O_3$ and $ZrO_2$ exerts the same technical effect as use of $Y_2O_3$ and $ZrO_2$. That is, due to the co-precipitated powder of $La_2O_3$ and $ZrO_2$, mechanical properties of the resulting sintered material are highly improved. Although such an improvement is also observed as compared with specimen No. 81, specimen No. 84 is degraded because the content of the sintering agent is insufficient.

TABLE IV

| Specimen No. | Sintering agent (wt %) | | | Physical properties | | |
|---|---|---|---|---|---|---|
| | $ZrO_2$ powder | $Y_2O_3$ powder | co-precipitated powder | Relative density (%) | Bending strength (Kgf/mm$^2$) | Weibull Modulus |
| *61 | 0.3 | 0.6 | — | 89.0 | 42 | 11 |
| *62 | 2.0 | 4.0 | — | 94.0 | 60 | 11 |
| *63 | 10.0 | 20.0 | — | 96.0 | 65 | 10 |
| *64 | 15.0 | 30.0 | — | 96.0 | 58 | 15 |
| *65 | 20.0 | 40.0 | — | 90.0 | 55 | 8 |
| **66 | — | — | 0.9 | 91.0 | 82 | 20 |
| 67 | — | — | 6.0 | 98.5 | 100 | 25 |
| 68 | — | — | 30.0 | 99.0 | 105 | 24 |
| 69 | — | — | 45.0 | 98.0 | 90 | 22 |
| **70 | — | — | 60.0 | 95.0 | 80 | 18 |

*Specimen Nos. 61 to 66 and 70 indicate the comparison examples.
**Specimen Nos. 66 and 70 are control examples.

Specimen Nos. 67 to 69 which were prepared according to an embodiment of the present invention present excellent physical properties as compared with specimen Nos. 61 to 66 and 70. Specimen Nos. 66 and 70 are degraded because the content of the sintering agent is outside of the range according to the preferred embodiment of the present invention.

It has been also confirmed that the co-precipitated powder which has not been converted to oxides exerts the same technical effect as the co-precipitated powder of oxides.

EXAMPLE 6

Co-precipitated powders each containing $ZrO_2$ and $Y_2O_3$ or lanthanide oxide were added to sinter silicon nitride in amounts indicated in Table VI under the same condition as Example 4. The mechanical properties of the resulting sintered silicon nitride are shown in Table VI.

TABLE VI

| Specimen No. | Sintering agent (wt %) | | Physical properties | | |
|---|---|---|---|---|---|
| | $ZrO_2$ (wt %) | Y or La (wt %**) | Relative density (%) | Bending strength (Kgf/mm$^2$) | Weibull Modulus |
| *91 | 0.8 | 2.0 | 97.0 | 90 | 18 |
| 92 | 1.5 | 2.0 | 98.5 | 100 | 23 |
| 93 | 15.0 | 2.0 | 99.0 | 110 | 24 |
| 94 | 10.0 | 2.0 | 99.8 | 110 | 30 |
| 95 | 20.0 | 2.0 | 99.5 | 105 | 28 |
| 96 | 24.0 | 2.0 | 99.0 | 100 | 22 |
| *97 | 28.0 | 2.0 | 99.0 | 100 | 20 |
| *98 | 35.0 | 2.0 | 98.5 | 90 | 21 |
| *99 | 10.0 | 0.1 | 93.0 | 85 | 13 |
| *100 | 10.0 | 0.3 | 96.0 | 80 | 15 |
| 101 | 10.0 | 0.6 | 99.0 | 100 | 20 |
| 102 | 10.0 | 1.0 | 99.5 | 105 | 25 |
| 103 | 10.0 | 5.0 | 99.5 | 115 | 29 |
| 104 | 10.0 | 8.0 | 99.0 | 112 | 26 |
| *105 | 10.0 | 12.0 | 98.0 | 95 | 25 |

*Specimen Nos. 91, 97 to 100 and 105 are control examples.
**The wt % of Y or La is indicated in terms of weight of element.

As shown in Table VI, it is understood that by using $ZrO_2$ in an amount of 1 to 25 vol% and oxide of Y or lanthanide of 0.5 to 10 wt% in terms of the amount of metal element, an excellent improvement in the mechanical properties can be attained. In more detail, specimen No. 91 is degraded in mechanical properties due to its insufficient content of $ZrO_2$, while specimen No. 98 is degraded particularly in bending strength because the $ZrO_2$ content is too high. with respect to the $Y_2O_3$ content, the mechanical properties of specimen Nos. 99 and 100 are not so improved since the $Y_2O_3$ content is too low, while specimen No. 105 is degraded particularly in bending strength because the $Y_2O_3$ content is too high.

Further, we confirmed that use of the co-precipitated powder of hydroxides of Zr and Y or lanthanide exerts the same technical effect as the co-precipitated powder of oxides thereof.

EXAMPLE 7

Powders of compounds of elements of IVa, Va, VIa groups of the Periodic Table were respectively added in an amount shown in Table VII together with a co-precipitated powder composed of $ZrO_2$ and $Y_2O_3$ to a silicon nitride powder. The mixture of the powders was thoroughly mixed and ground and then compacted. The compact was sintered at 1850° C. for 2 hours under a nitrogen atmosphere of 20 atms.

The content of $ZrO_2$ and $Y_2O_3$ in the resulting sintered silicon nitride were 2.0 wt% and 4.0 wt% respectively.

The mechanical properties of the obtained sintered silicon nitride are shown in Table VII.

TABLE VII

| Specimen No. | Compounds of IVa, Va, VIa element | | Physical properties | | | |
|---|---|---|---|---|---|---|
| | Compounds | amount (wt %**) | Relative density (%) | Bending strength (Kgf/mm$^2$) | Weibull Modulus | Hardness ($H_{RA}$) |
| *110 | — | — | 98.5 | 100 | 25 | 92.5 |
| *111 | TiN | 0.5 | 98.5 | 95 | 23 | 92.5 |
| 112 | TiN | 1.5 | 99.0 | 115 | 26 | 92.8 |
| 113 | TiN | 8.0 | 99.5 | 120 | 29 | 94.0 |
| 114 | TiN | 12.0 | 99.5 | 125 | 30 | 94.5 |
| *115 | TiN | 16.0 | 98.0 | 95 | 26 | 94.5 |
| *116 | TiN | 20.0 | 97.5 | 90 | 27 | 94.5 |
| 117 | TiC | 10.0 | 99.0 | 110 | 28 | 94.5 |
| 118 | TiC$_{0.5}$N$_{0.5}$ | 10.0 | 99.5 | 125 | 28 | 94.0 |
| 119 | WC | 10.0 | 99.0 | 105 | 30 | 93.5 |
| 120 | VC | 10.0 | 99.0 | 120 | 30 | 94.0 |
| 121 | TaN | 10.0 | 99.5 | 120 | 28 | 94.0 |
| 122 | Ti$_{0.1}$W$_{0.9}$C$_{0.7}$N$_{0.1}$ | 10.0 | 99.5 | 110 | 30 | 93.5 |

*Specimen Nos. 110, 111, 115 and 116 are control examples.
**The wt % is indicated in terms of weight of element.

Specimens containing the element of IVa, Va and VIa groups of the Periodic Table in an amount of 1 to 15 wt%, that is, specimen Nos. 112 to 114 and 117 to 122 have excellent mechanical properties as compared with specimen No. 110 which does not contain the element.

The bending strength of specimen No. 111 is, however, degraded as compared with specimen No. 110 because the content of TiN is too low. To the contrary, specimen No. 116 is degraded particularly in bending strength because it contains too high an amount of TiN.

EXAMPLE 8

Aqueous solution containing Zr, Y and anyone element of IVa, Va and VIa group of the Periodic Table was prepared and the pH thereof was adjusted to co-precipitate hydroxides of the above elements. The co-precipitated hydroxides were heated to be thermally decomposed into oxides.

The thus obtained co-precipitated powder of oxides was mixed in an amount of 15 wt% with a silicon nitride powder and groud thoroughly. The powder mixture was then compacted and sintered under the same condition as Example 4, to thereby obtain specimen Nos. 131 to 134.

The content of $ZrO_2$, $Y_2O_3$ and oxide of the element of IVa, Va and VIa groups of the Periodic Table in each specimen are indicated in Table VIII, together with the physical properties of the resulting sintered silicon nitride.

Further, powders each containing the above oxides were mixed with the silicon nitride powder and then sintered in the same manner as the above to thereby obtain specimen Nos. 135 to 138 which contain the sintering agents in the same amount as the corresponding one of specimen Nos. 131 to 134. The physical properties thereof are also shown in Table VIII.

TABLE VIII

| Specimen No. | Sintering agent (wt %) | | | Physical properties | | |
|---|---|---|---|---|---|---|
| | $ZrO_2$ | $Y_2O_3$ | element of IVa, Va, VIa group | Relative density (%) | Bending strength (Kgf/mm$^2$) | Weibull Modulus |
| 131 | 2 | 4 | $TiO_2$ 2 | 99 | 110 | 26 |
| 132 | 2 | 4 | $TiO_2$ 5 | 99 | 105 | 29 |
| 133 | 2 | 4 | $Cr_2O_3$ 2 | 99 | 105 | 28 |
| 134 | 2 | 4 | $Ta_2O_5$ 2 | 98 | 100 | 28 |
| *135 | 2 | 4 | $TiO_2$ 2 | 96 | 53 | 8 |
| *136 | 2 | 4 | $TiO_2$ 5 | 95 | 62 | 9 |
| *137 | 2 | 4 | $Cr_2O_3$ 2 | 95 | 58 | 9 |
| *138 | 2 | 4 | $Ta_2O_5$ 2 | 96 | 49 | 7 |

*Specimen Nos. 135 to 138 are comparison examples.

As readily understood from Table VIII, use of co-precipitated and burned powder including $ZrO_2$, $Y_2O_3$ and oxide of the element selected from IVa, Va and VIa groups of the Periodic Table is effective in improving the physical properties of the sintered product.

We claim:

1. A process for preparing a sintered silicon nitride comprising the steps of:
   providing a powder of a sintering agent as a powder mixture, prepared by co-precipitation, consisting of an oxide and/or hydroxide of at least two kinds of metals selected from the group consisting of Mg, Al, Si, Sc, T, lanthanide, Ti, Zr and Hf;
   mixing a powder of silicon nitride with the powder of the sintering agent;
   compacting the obtained mixture; and
   sintering the compacted mixture in a non-oxidizing atmosphere.

2. A process as claimed in claim 1, wherein the sintering agent is mixed in an amount of 1.0 to 50 wt% calculated in terms of the oxide contained therein on the basis of the total weight of the sintered silicon nitride.

3. A process as claimed in claim 2, wherein the co-precipitated powder consists of an oxide and/or hydroxide of metals selected from the group consisting of Zr, Y and lanthanide.

4. A process as claimed in claim 3, wherein the co-precipitated powder consists of an oxide and/or hydroxide of Zr and at least one element selected from the group consisting of Y and lanthanide.

5. A process as claimed in claim 4, wherein the co-precipitated powder consists of $ZrO_2$ and an oxide of at least one element selected from the group consisting of Y and lanthanide, and the content of $ZrO_2$ being 1 to 25 vol% on the basis of the total volume of the sintered silicon nitride and the content of the oxide of Y or lanthanide being 0.5 to 10 wt% calculated in terms of the amount of the element on the basis of the total weight of the sintered silicon nitride.

6. A process as claimed in claim 5, wherein $ZrO_2$ is cubic crystal which has been stabilized with at least one member selected from the group consisting of CaO, MgO and $Y_2O_3$.

7. A process as claimed in claim 6, wherein, in order to provide the sintering agent, hydroxides of Zr and Y are co-precipitated and the co-precipitate is then burned to provide a powder of cubic $ZrO_2$ stabilized with $Y_2O_3$.

8. A process as claimed in claim 4, further incorporating in the mixture 1 to 15 wt% of at least one element selected from the group consisting of the elements of IVa (except Zr), Va and VIa groups of the Periodic Table.

9. A process as claimed in claim 8, wherein the at least one element is selected from IVa (except Zr), Va and VIa group of the Periodic Table and is added to the mixture in the form of anyone of carbide, nitride, carbonitride, oxide and the solid solution thereof.

10. A process as claimed in claim 9, wherein the oxide of at least one element selected from the group consisting of IVa (except Zr), Va and VIa groups of the Periodic Table is added to the mixture in the co-precipitated form with oxide or hydroxide of Zr and Y or lanthanide.

11. A process as claimed in claim 1, wherein the hydroxides of metal have been prepared by adjusting the pH of an aqueous solution containing a water-soluble metal chloride, metal nitrate or organic metal salt to thereby co-precipitate the metal hydroxides therefrom.

12. A process as claimed in claim 11, further burning the metal hydroxides to thereby provide a co-precipitate of metal oxides.

13. A process as claimed in claim 1, wherein the mean particle size of the co-precipitated powder is smaller than 2 microns.

14. A process as claimed in claim 1, wherein the sintering is conducted under a depressurized condition.

15. A process as claimed in claim 1, wherein the sintering is conducted under a pressurized condition.

16. A process for preparing a sintered silicon nitride comprising the steps of:
   providing a powder consisting of $ZrO_2$ and $Y_2O_3$ prepared by co-precipitation;
   mixing a powder of silicon nitride with the powder of $ZrO_2$ and $Y_2O_3$;
   compacting the obtained mixture; and
   sintering the compacted mixture in a non-oxidizing atmosphere.

17. A process as claimed in claim 16, wherein the content of $ZrO_2$ is 1 to 25 vol% on the basis of the total volume of the sintered silicon nitride and the content of the oxide of Y is 0.5 to 10 wt% calculated in terms of the amount of the element on the basis of the total weight of the sintered silicon nitride.

18. A process as claimed in claim 17, wherein $ZrO_2$ is cubic crystal which has been stabilized with at least one member selected from the group consisting of CaO, MgO and $Y_2O_3$.

19. A process as claimed in claim 18, wherein hydroxides of Zr and Y are co-precipitated and the co-precipitate is then burned to provide a powder of cubic $ZrO_2$ stabilized with $Y_2O_3$.

20. A process as claimed in claim 16, further incorporating to the mixture 1 to 15 wt% in at least one element selected from the group consisting of the elements of IVa (except Zr), Va and VIa groups of the Periodic Table.

21. A process as claimed in claim 20, wherein the at least one element is selected from IVa (except Zr), Va and VIa groups of the Periodic Table and is added to the mixture in the form of anyone of carbide, nitride, carbonitride, oxide and the solid solution thereof.

22. A process as claimed in claim 21, wherein the oxide of at least one element selected from the group consisting of IVa (except Zr), Va and VIa groups of the Periodic Table is added to the mixture in the co-precipitated form with the and lanthanide oxide or hydroxide of Zr and Y.

23. A process as claimed in claim 16, wherein, in order to provide the sintering agent, the hydroxides of metal have been prepared by adjusting the pH of an aqueous solution containing a water-soluble metal chloride, metal nitrate or organic metal salt to co-precipitate the metal hydroxides therefrom.

24. A process as claimed in claim 23, further burning the metal hydroxides to thereby provide a co-precipitate of metal oxides.

25. A process as claimed in claim 16, wherein the mean particule size of the co-precipitated powder is smaller than 2 microns.

26. A process as claimed in claim 16, wherein the sintering is conducted under a depressurized condition.

27. A process as claimed in claim 16, wherein the sintering is conducted under a pressurized condition.

28. A process for preparing a sintered silicon nitride comprising the steps of:
preparing an aqueous solution containing water-soluble chloride, nitrate or organic salt of at least two metals selected from the group consisting of Mg, Al, Si, Sc, Y, lanthanide, Ti, Zr and Hf;
adjusting the pH of said aqueous solution to thereby co-precipitate hydroxides of said metals therefrom;
burning the co-precipitated hydroxides to form oxides of said metals in the form of powder;
mixing a powder of silicon nitride with said burned metal oxide powder;
compacting the obtained mixture; and
sintering the compacted mixture in a non-oxidizing atmosphere;
whereby providing a sintered silicon nitride having improved strength and uniformity in its mechanical properties.

29. A process as claimed in claim 28, wherein the burned powder is mixed in an amount of 1.0 to 50 wt% calculated in terms of the oxide contained therein on the basis of the total weight of the sintered silicon nitride.

30. A process as claimed in claim 29, wherein the burned powder consists of oxides of metals selected from the group consisting of Zr, Y and lanthanide.

31. A process as claimed in claim 30, wherein the burned powder consists of oxides of Zr and at least one element selected from the group consisting of Y and lanthanide.

32. A process as claimed in claim 31, wherein the content of $ZrO_2$ being 1 to 25 vol% on the basis of the total volume of the sintered silicon nitride and the content of the oxide of Y or lanthanide being 0.5 to 10 wt% calculated in terms of the amount of the element Y or lanthanide on the basis of the total weight of the sintered silicon nitride.

33. A process as claimed in claim 32, wherein the burned powder includes cubic $ZrO_2$ stabilized with $Y_2O_3$.

34. A process as claimed in claim 31, further incorporating in the mixture 1 to 15 wt% of at least one element selected from the group consisting of the elements of IVa (except Zr), Va and VIa groups of the Periodic Table.

35. A process as claimed in claim 34, wherein the at least one element is selected from IVa (except Zr), Va and VIa groups of the Periodic Table and is added to the mixture in the form of anyone of carbide, nitride, carbonitride, oxide and the solid solution thereof.

36. A process as claimed in claim 35, wherein the oxide of at least one element selected from the group consisting of IVa (except Zr), Va and VIa groups of the Periodic Table is added to the mixture in the co-precipitated form with oxides of Zr and Y or lanthanide.

37. A process as claimed in claim 28, wherein the mean particle size of the burned powder is smaller than 2 microns.

38. A process as claimed in claim 28, wherein the sintering is conducted under a depressurized condition.

39. A process as claimed in claim 28, wherein the sintering is conducted under a pressurized condition.

* * * * *